Patented Mar. 16, 1954

2,672,456

UNITED STATES PATENT OFFICE 2,672,456

MOLDING COMPOSITIONS

Cecil W. Gayler, Ridley Park, Pa., assignor to American Viscose Corporation, Wilmington, Del., a corporation of Delaware No Drawing. Application December 21, 1949, Serial No. 134,355

14 Claims. (Cl. 260—43)

This invention relates to compositions comprising a copolymer of acrylonitrile and vinyl chloride containing an average of from 50 to 65% of vinyl chloride and from 35 to 50% of acrylonitrile in the polymer molecule, and adapted to be formed into shaped articles such as films, foils, rods, tubes, bottle caps and sealing bands, casings, textile filaments or fibers, and molded objects generally.

Copolymers of acrylonitrile and vinyl chloride of the composition specified are soluble in acetone, and articles formed therefrom can be redissolved in that solvent. Another disadvantage of these copolymers is that they are brittle and, for many purposes, cannot be rendered less so by the incorporation of substances which function only as plasticizers, because of the lowered softening point of the plasticized product. In addition, apparently as a result of the pronounced dipole attraction between the copolymer chains, which imparts stiffness to the copolymer but does not contribute to the impact strength, articles molded from the copolymer are characterized by low impact strength. The resistance of the copolymers to fracture is due solely to cohesive forces of secondary bonds and the force required to break such bonds is comparatively slight, especially if the copolymer is unoriented. The low impact strength of articles molded from the copolymers is a deterrent to general application of the copolymers in industry.

It is an object of this invention to provide compositions comprising the acrylonitrile-vinyl chloride copolymers adapted to be formed into shaped articles which, after the shaping, are insoluble in solvents for the unshaped compositions. Another object is to provide shaped articles comprising the acrylonitrile-vinyl chloride copolymers and characterized by high impact strength and softening temperatures. A further object is to provide insoluble, heat-resistant flexible films and textile filaments or fibers.

These objects are accomplished by incorporating with the acrylonitrile-vinyl chloride copolymer containing from 50 to 65% vinyl chloride from 0.5 to about 11.8% of an initially soluble and fusible precondensate of a thermosetting resin capable of forming a cross-linked structure with the copolymer, forming the composition into a film, thread, or other article, and converting the resulting article by heat into a form insoluble in solvents in which the mixed copolymer and cross-linking resin are soluble. By "resin precondensate capable of forming a cross-linked structure with the copolymer," is meant a soluble, fusible resin precondensate which reacts chemically with two or more chains of the acrylonitrile-vinyl chloride copolymer to form a cross-linked structure and which is convertible by heat to insoluble, infusible condition. Examples of suitable cross-linking resins are the phenolic resins generally, melamine-formaldehyde resins, urea-formaldehyde resins, and polyesters, such as diallyl phthalate, which under heating in the presence of a peroxy type catalyst form three-dimensional thermoset structures. The blending of the copolymer and cross-linking resin may be effected by several methods. For example, the copolymer and the cross-linking resin precondensate may be dissolved in a solvent, such as acetone, the solution being brought to the desired shape, and the shaped article being thereafter heated at elevated temperatures to effect reaction between the copolymer and cross-linking agent.

Alternatively, the acrylonitrile-vinyl chloride copolymer and from 0.5 to about 11.8% of the cross-linking resin precondensate may be mixed or ground together in a ball mill or other suitable mixer commonly employed in the plastic art, or the precondensate may be added to the copolymer on hot rolls in a way similar to the compounding of rubber compositions. Another suitable method of incorporating the cross-linking resin with the acrylonitrile-vinyl chloride copolymer is to dissolve the copolymer and resin precondensate in a readily volatile solvent, to mix or grind the materials in any suitable apparatus, for example a ball mill, and thereafter to evaporate the solvent.

The phenolic resins include products obtained by the reaction of a phenolic body such as phenol, cresol, resorcinol, naphthol, etc. with a carbonyl compound such as formaldehyde, acetone, benzaldehyde, furfural or their reaction products with ammonia. In the presently preferred embodiment of the invention, the cross-linking resin is a potentially thermosetting phenolic resin and, specifically, a B-stage condensation product of phenol and formaldehyde, i. e., a fusible, soluble phenol-formaldehyde precondensate.

In order to prevent free hydrochloric acid in the acrylonitrile-vinyl chloride copolymer (which is a curing catalyst for the resin precondensate) from prematurely polymerizing the cross-linking resin to the infusible, insoluble state before reaction thereof with the copolymer has been effected, it is desirable to include an inhibitor in the composition. When the copolymer and cross-linking resin are blended in a solvent, the inhibitor should also be soluble in the solvent.

Suitable inhibitors are the di-alkyl amines containing from 1 to 5 carbons in each of the alkyl radicals, which may be the same or different. The proportion of inhibitor incorporated in the composition may vary, but usually from 1 to 5% by weight is sufficient.

The cross-linking resin precondensate is used in a proportion of from 0.5 to about 11.8% by weight based on the weight of the acrylonitrile-vinyl chloride copolymer. Under such conditions, when the composition is shaped or molded and the shaped article is heated at elevated temperature, articles are obtained which comprise the acrylonitrile-vinyl chloride copolymer modified by a small number of cross-links in a ratio of from one cross-link to 100 units of the copolymer to about one cross-link to 200 units of the copolymer. By the inclusion of the cross-linking resin molecule between the chains of the copolymer, the polar groups are spread apart and have less attraction for each other so that, in effect, the polymer is internally plasticized. Any decrease in flexibility of the copolymer as a result of the cross-linking is compensated for by the plasticizing effect of the cross-linking resin molecule inserted between the chains. Stiffness tests prove that the flexibility of the article is not reduced as compared to the flexibility of articles comprising the acrylonitrile-vinyl chloride copolymers which have not been modified with the cross-linking resin. The articles formed from the compositions of the invention have high softening temperatures, and increased impact strength. The high impact strength of the articles is attributed to the presence of the cross-links which make it necessary to break primary bonds, as well as secondary bonds, to fracture the article, and to the relatively small number of such cross-links which permits deformation of the articles and allows the breaking energy to be distributed over a comparatively large area. The articles formed from the compositions of the invention exhibit increased toughness, which may also be attributed to the presence of the cross-links, which have the effect of increasing chain length. The cross-linked copolymer exhibits increased heat stability, having a higher softening temperature than the unmodified copolymer. Articles formed therefrom are dimensionally stable at elevated temperatures of 100° C. and above.

The upper limit of about 11.8% by weight of the cross-linking resin precondensate, based on the acrylonitrile-vinyl chloride copolymer weight, must be observed, in order to produce shaped articles characterized by high impact strength, high softening temperature, and flexibility.

Solutions of the blended acrylonitrile-vinyl chloride copolymer and cross-linking resin may be converted into shaped articles in any manner known in the art. They can be cast or spun into an evaporative atmosphere or into a suitable coagulating bath comprising a liquid which is a non-solvent for the cross-linked polymer and an extractive for the solvent, such as water, for example, and in either method the solution may be cast or spun continuously or discontinuously. In casting film, the composition is preferably cast on to a heated casting surface such as a metal wheel or continuous belt, and the film is stripped off after the solvent has been evaporated and the precondensate has been reacted with the polymer. Alternatively, a film may be formed by casting the composition on to a glass plate, evaporating the solvent and reacting the resin precondensate with the copolymer.

Dry moldable compositions comprising the mixed acrylonitrile-vinyl chloride copolymer and cross-linking resin may be molded by either compression or injection molding methods.

After the shaping operation, the copolymer of acrylonitrile and vinyl chloride is reacted with the cross-linking resin. Generally, this reaction is effected by heating the article to elevated temperatures of from 100 to 150° C. for a time inversely related to the temperature, usually between 3 and 30 minutes. However, at least partial reaction of the cross-linking resin with the copolymer may be effected at lower temperatures, for example during drying, if the article is subjected to a separate preliminary drying operation, or during formation of the article in an evaporative atmosphere.

The cross-linking resin may be reacted with the acrylonitrile-vinyl chloride copolymer at any suitable stage during or after the film, thread, or other article is formed. It may be heated before, during, or after drying, in the molding or shaping device and, in the case of films or massive molded objects, the heating may be performed before the film is stripped from the casting support, or before the molded object is removed from the mold. The inherently thermoplastic acrylonitrile-vinyl chloride copolymer is permanently set in the shaped or molded condition by the reaction with the cross-linking resin precondensate and heat-setting of the precondensate.

The following detailed, non-limiting examples are given to illustrate the invention:

*Example I*

A solution comprising 80% of acetone, 17% of an acrylonitrile-vinyl chloride copolymer (45% acrylonitrile, 55% vinyl chloride), 2% of a B-stage phenol-formaldehyde resin, and 1% of di-n-butylamine was cast to a film, using an adjustable film spreader set at 50 mils. The film was dried to evaporate the solvent, stripped from the support, and then heated at 120° C. for 25 minutes to react the phenol-formaldehyde resin with the copolymer and complete the polymerization thereof to the insoluble, infusible state.

Stiffness in flexure of this film was determined by a Tour Marshall stiffness tester using the equation: (ASTM D-747-43 T ASTM Standards on Plastics, 1945):

$$E = \frac{4S}{Wd}3 \times \frac{M \times \text{load scale reading}}{100\phi}$$

in which $S$ = span on Tour Marshall Stiffness tester in inches
$M$ = set load in pounds
$W$ = width of sample in inches
$d$ = thickness of sample in inches
$\phi$ = angle of deflection in radians
$E$ = modulus of elasticity in p. s. i.

The E value for the film was $4.3 \times 10^5$.

For purposes of comparison, a film was cast from a solution of the acrylonitrile-vinyl chloride copolymer alone in acetone (83% acetone; 17% of the unmodified copolymer) under the same conditions as above, and the stiffness in flexure determined in the same manner. The E value for this film of the unmodified copolymer was found to be $4.5 \times 10$. The greater flexibility of the film comprising the cross-linked copolymer is evidence that any stiffness imparted to the copolymer by the cross-links is more than compensated by the internal plasticizing effect resulting from separation of the dipoles of the copolymer by the small proportion of phenol-formaldehyde resin molecules.

*Example II*

A mixture consisting of 97% of an acrylonitrile-vinyl chloride copolymer (45% acrylonitrile, 55% vinyl chloride), 2% of a B-stage phenol-formaldehyde resin, and 1% of di-n-butylamine, which had been prepared by mixing the ingredients in a ball mill, was molded in a compression mold at 140° C. and 5000 p. s. i. for one minute and tested for hardness on the Rockwell tester. The average Rockwell Hardness value was M 97. This compared with an average value of M 90 for the unmodified copolymer molded under the same conditions.

*Example III*

A mixture of 92.5% of an acrylonitrile-vinyl chloride copolymer containing 45% acrylonitrile and 55% of vinyl chloride, 7.5% of a melamine-formaldehyde resin precondensate and 1% of di-n-butylamine, obtained by mixing the ingredients in a ball mill was injection molded, and specimens of the molded product were notched on a milling machine and tested on the Izod impact tester according to ASTM impact test specifications (ASTM D–256–43–T, ASTM Standards on Plastics, 1945), the values being determined by the formula $$I = \frac{\text{inch pounds to break sample}}{12 \times \text{thickness in inches}}$$

The value for I (impact force in ft. lbs./in. notch required) was 0.42 (average of 3 tests). This compared with a value of 0.29 (average of two tests) for the unmodified copolymer.

The melamine-formaldehyde resin precondensate used in this example was used in the form of a solution of the semi-cured resin in butanol and Xylol (which is available commercially under the name Uformite MM–55).

*Example IV*

A mixture consisting of 94% of a copolymer containing 45% acrylonitrile and 55% vinyl chloride, 5% of a urea-formaldehyde resin precondensate, and 1% of di-n-butylamine, obtained by mixing the ingredients in a ball mill, was compression molded as in Example II. The articles obtained have an average Rockwell Hardness value of M 97.

The urea-formaldehyde resin precondensate was in the form of a 50% solution of the semi-cured resin in butanol and Xylol, which is available commercially under the name Uformite F–200 E.

*Example V*

A solution comprising 82% acetone, 1% diallyl phthalate, benzoyl peroxide, and 18% of a copolymer of acrylonitrile and vinyl chloride containing 45% acrylonitrile and 55% vinyl chloride, was cast to form a film which was handled as in Example I and found to have a value for E the same as that for the film of Example I. This film, which was insoluble in acetone, showed excellent heat-stability, and shrank only 2% at 100° C., as compared to 12% shrinkage at that temperature for a film of the acrylonitrile-vinyl chloride copolymer which was not modified by the thermosetting ester.

The examples illustrate the invention in terms of an acrylonitrile-vinyl chloride copolymer containing 45% acrylonitrile and 55% vinyl chloride, but is not limited to that specific embodiment. The copolymer may contain an average of from 50 to 65% vinyl chloride and from 35 to 50% acrylonitrile, and may be homogeneous or heterogeneous.

If desired, small proportions of other modifying agents, such as dyes, pigments, fillers, etc. which do not alter the mechanical properties of the modified copolymer may be incorporated in the composition.

Some modification or variation may be made in practicing the invention without departing from the spirit and scope thereof. It is to be understood, therefore, that the invention is not to be limited except as defined by the appended claims.

I claim:

1. A composition comprising a mixture of (a) a copolymer of acrylonitrile and vinyl chloride containing, by weight in the copolymer molecule, an average of from 60 to 65% vinyl chloride and from 35 to 50% acrylonitrile, (b) from 0.5 to about 11.8% by weight based on the weight of the copolymer of a reactive, potentially thermosetting condensate which, on heating of the mixture to a temperature between 100 and 150° C., reacts with the vinyl chloride-acrylonitrile copolymer to form cross-links between the copolymer chains and is converted to the thermoset condition, said reactive condensate being selected from the group consisting of diallyl phthalate, phenol-formaldehyde resin precondensates, melamine-formaldehyde resin precondensates, and urea-formaldehyde resin precondensates, and (c) as an inhibitor which prevents premature condensation of the reactive condensate to the thermoset condition, from 1 to 5% by weight based on the total weight of the copolymer and the reactive condensate of a dialkylated monoamine containing from 1 to 5 carbon atoms in each alkyl radical.

2. A flexible shaped article formed from a composition comprising a mixture of (a) a copolymer of acrylonitrile and vinyl chloride containing, by weight in the copolymer molecule, an average of from 60 to 65% vinyl chloride and from 35 to 50% acrylonitrile, (b) from 0.5 to about 11.8% by weight based on the weight of the copolymer of a reactive, potentially thermosetting condensate which, on heating of the mixture to a temperature between 100 and 150° C., reacts with the vinyl chloride-acrylonitrile copolymer to form cross-links between the copolymer chains and is converted to the thermoset condition, said reactive condensate being selected from the group consisting of diallyl phthalate, phenol-formaldehyde resin precondensates, melamine-formaldehyde resin precondensates, and urea-formaldehyde resin precondensates, and (c) as an inhibitor which prevents premature condensation of the reactive condensate to the thermoset condition, from 1 to 5% by weight based on the total weight of the copolymer and the reactive condensate of a dialkylated monoamine containing from 1 to 5 carbon atoms in each alkyl radical, the thermosetting condensate being in the thermoset condition in the article and reacted with the copolymer to form cross-links between the copolymer chains, and the shaped article being characterized by increased impact strength as compared to the impact strength of a corresponding article comprising an acrylonitrile-vinyl chloride copolymer of the same composition but which is not reacted with the thermoset condensate.

3. The method of making shaped articles of a copolymer of acrylonitrile and vinyl chloride containing, by weight in the polymer molecule, from 50 to 65% vinyl chloride and from 35 to 50% of acrylonitrile and characterized by high impact strength which comprises forming the shaped article from a mixture of (a) the acrylonitrile-vinyl chloride copolymer, (b) from 0.5 to about 11.8% by weight based on the weight of the copolymer of a reactive, potentially thermosetting condensate which, on heating of the mixture to a temperature between 100 and 150° C., reacts with the copolymer to form cross-links between the copolymer chains and is converted to the thermoset condition, said reactive condensate being selected from the group consisting of diallyl phthalate, phenol-formaldehyde resin precondensates, melamine-formaldehyde resin precondensates, and urea-formaldehyde resin precondensates, and (c) as an inhibitor which prevents premature condensation of the reactive condensate to the thermoset condition, from 1 to 5% by weight based on the total weight of the copolymer and the reactive condensate of the dialkylated monoamine containing from 1 to 5 carbon atoms in each alkyl radical, and heating the shaped article to a temperature between 100 and 150° C.

4. A composition as in claim 1, wherein the condensate is a phenol-formaldehyde resin precondensate.

5. A composition as in claim 1, wherein the condensate is a urea-formaldehyde resin precondensate.

6. A composition as in claim 1, wherein the condensate is a melamine-formaldehyde resin precondensate.

7. A composition as in claim 1, wherein the condensate is a diallyl phthalate.

8. Fexible shaped articles as in claim 2, in which the chains of the acrylonitrile-vinyl chloride copolymer are cross-linked by a phenol-formaldehyde resin.

9. Flexible shaped articles as in claim 2, in which the chains of the acrylonitrile-vinyl chloride copolymer are cross-linked by a urea-formaldehyde resin.

10. Flexible shaped articles as in claim 2, in which the chains of the acrylonitrile-vinyl chloride copolymer are cross-linked by a melamine-formaldehyde resin.

11. Flexible shaped articles as in claim 2, in which the chains of the acrylonitrile-vinyl chloride copolymer are cross-linked by diallyl phthalate.

12. The method of claim 3, wherein the acrylonitrile vinyl chloride copolymer is mixed with a phenol-formaldehyde resin precondensate.

13. The method of claim 3, wherein the acrylonitrile-vinyl chloride copolymer is mixed with a urea-formaldehyde resin precondensate.

14. The method of claim 3, wherein the acrylonitrile-vinyl chloride copolymer is mixed with a melamine-formaldehyde resin precondensate.

CECIL W. GAYLER.

References Cited in the file of this patent

UNITED STATES PATENTS

| Number | Name | Date |
| --- | --- | --- |
| 2,151,975 | Kline | Mar. 28, 1939 |
| 2,420,330 | Shriver et al. | Mar. 13, 1947 |
| 2,421,852 | Rogers, Jr., et al. | June 10, 1947 |
| 2,431,078 | Powell 3rd et al. | Nov. 18, 1947 |
| 2,432,586 | Quarles | Dec. 16, 1947 |
| 2,514,185 | Eberly | July 4, 1950 |